June 20, 1967 J. M. DE BEVOISE 3,326,318

ANTI-SKID VANE

Filed Oct. 22, 1965 2 Sheets-Sheet 1

INVENTOR.
John M. De Bevoise
BY
Knox & Knox

June 20, 1967  J. M. DE BEVOISE  3,326,318

ANTI-SKID VANE

Filed Oct. 22, 1965  2 Sheets-Sheet 2

INVENTOR.
John M. DeBevoise
BY *Knox & Knox*

United States Patent Office 3,326,318
Patented June 20, 1967

3,326,318
ANTI-SKID VANE
John M. De Bevoise, 5072 San Joaquin Drive,
San Diego, Calif. 92109
Filed Oct. 22, 1965, Ser. No. 500,550
7 Claims. (Cl. 180—79.2)

The present invention relates to vehicles and specifically to an anti-skid vane for use on vehicles.

When a high speed vehicle makes a turn, the rate of turn at any given speed is limited by the side force, or centripetal force, that can be developed. In a conventional racing car the attainable side force is limited by the frictional resistance of the tires to skidding. If the side force required for a desired turn is greater than that which the frictional resistance of the tires to skidding can generate, the vehicle will not make the desired turn and will instead slide or skid in a wider turn. The attainable centripetal force can be increased by the use of a vertical fin, either fixed or movable about a vertical axis. Movable fins have been used to counteract skidding, but they have been either coupled to the steering linkage so as to have their position proportional to the angle to which the steering wheels have been turned or else have been controlled directly by the driver. The relationship between the side force and the angle of the steering wheels depends on the speed and on whether the vehicle is skidding, so that coupling the fin so that its position depends on the steering wheel angle, does not work well. Direct control by the driver is objectional in that it requires attention that the driver may not be able to give.

The primary object of this invention, therefore, is to provide an anti-skid vane which is actuated by control means sensitive to the side force existing between the wheels and the ground.

Another object of this invention is to provide an anti-skid vane which is controlled so as to produce a side force existing between the wheels and the ground.

Another object of this invention is to provide an anti-skid vane which provides a rolling, or lateral moment opposite to that which the side force on the wheels provides.

A further object of this invention is to provide an anti-skid vane which is independent of steering and wheel position and does not require specific operation by the driver.

The anti-skid vane, its actuating means and the application to a vehicle are illustrated in the drawings, in which.

Similar characters of reference indicate similar or identical elements and portions throughout the specification and throughout the views of the drawing.

Figure 1:
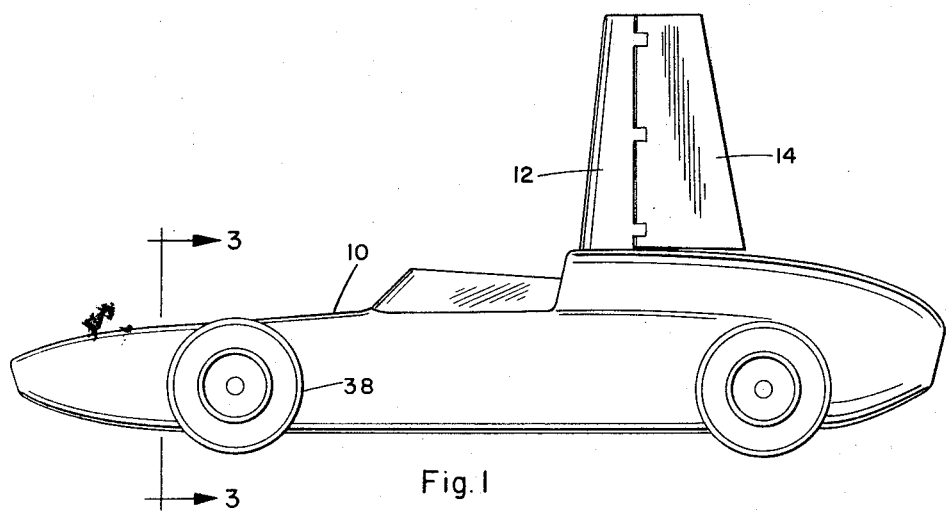
FIGURE 1 is a side elevation view of a typical vehicle incorporating the anti-skid vane.
Figure 2:
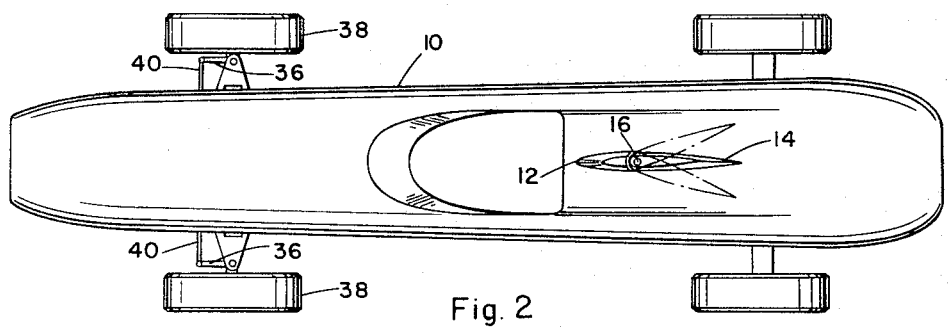
FIGURE 2 is a top plan view thereof.
Figure 3:
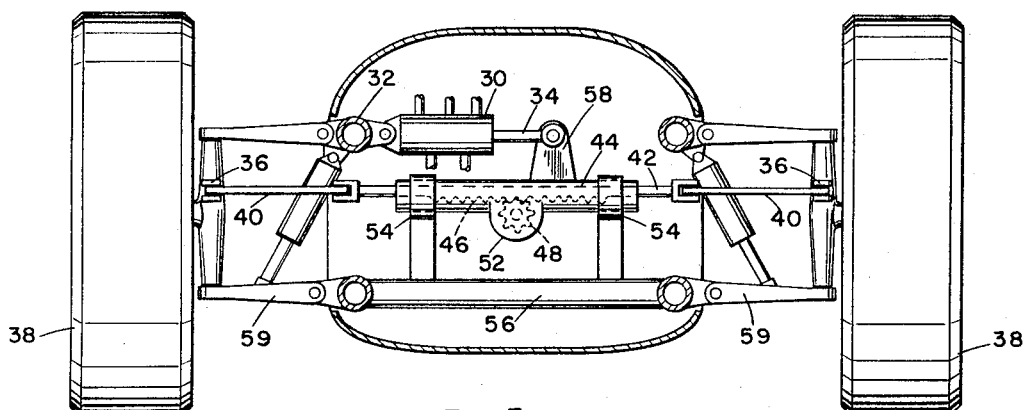
FIGURE 3 is an enlarged sectional view taken on line 3—3 of FIGURE 1.

In FIGURES 1 and 2, a typical racing car 10 is provided with an upright fixed fin 12 which supports a movable vane 14 mounted at the rear of the fin on a generally vertical hinge 16. The fin and vane comprise an aerodynamic structure and may have any suitable airfoil cross section. The axis of hinge 16 is preferably at or close to the longitudinal center of mass of the vehicle, so that the aerodynamic side force does not generate a substantial yawing moment. However, the location is not especially critical, since a considerable moment arm would be required between the center of mass and the movable vane to provide any appreciable yaw reaction in the manner of a rudder. In fact the action of the moving vane more closely resembles that of an aileron on an aircraft.

Figure 4:
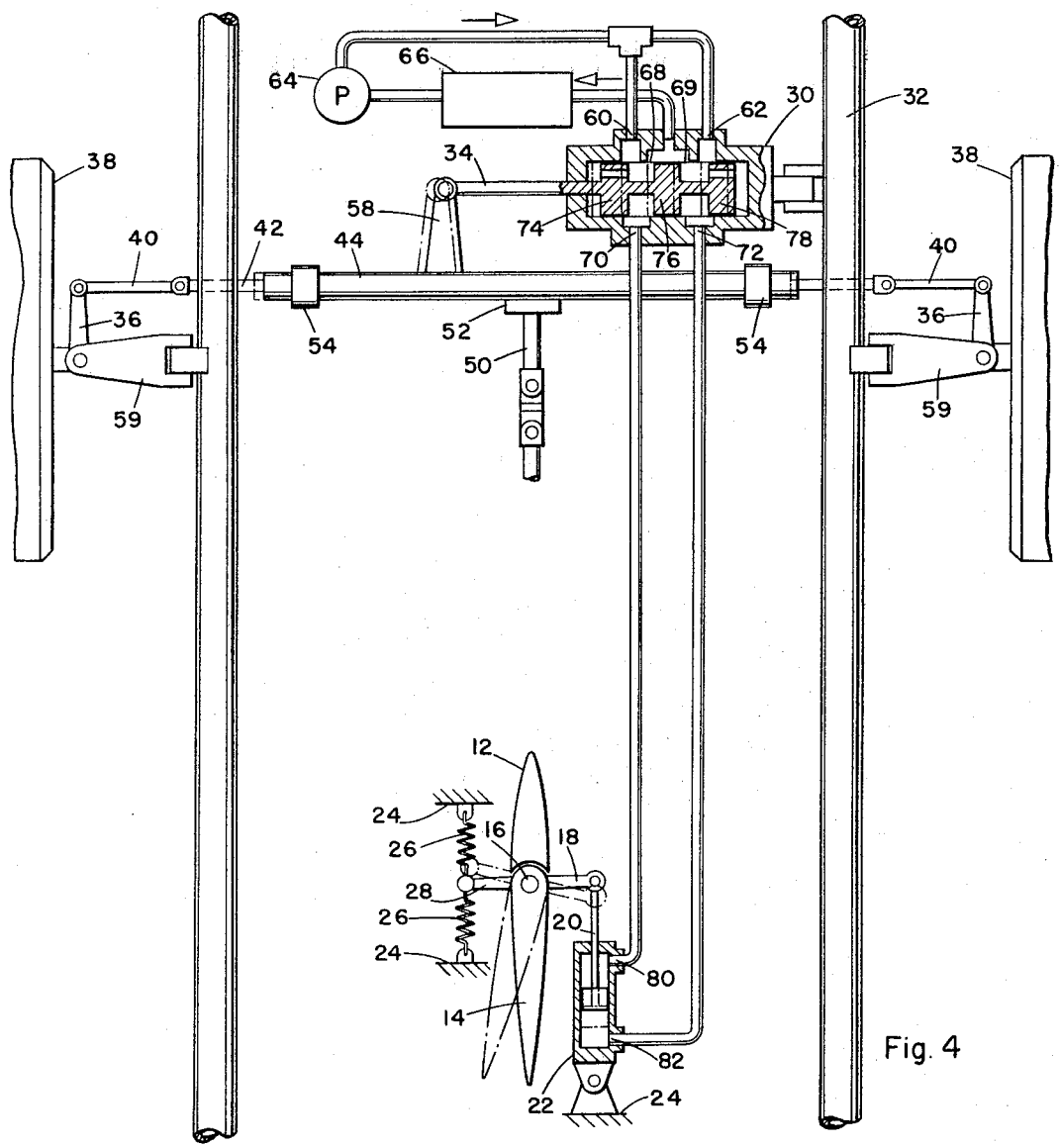
FIGURE 4 is a diagram of the complete actuating system.

Various means may be used to provide power for the moving vane, that illustrated in FIGURE 4 using a simple, independent hydraulic system which incorporates the force sensing means in the basic system. Vane 16 has an actuating arm 18 connected to the piston rod 20 of a hydraulic cylinder 22, which is attached to a suitable portion of the vehicle frame srtucture, generally indicated at 24. The vane is centered by centering springs 26 connected between the vehicle frame and a centering arm 28 fixed to the vane. Alternatively the springs could be attached directly to the actuating arm 18 or to some other convenient point on vane 14.

Cylinder 22 is operated through a sensing valve 30 which utilizes the side force directly for actuating the valve means. The sensing valve 30 is attached to the vehicle frame, in this instance one of the side frame rails 32, and has a sensing rod 34 which is coupled to the wheels in a suitable maner. As illustrated, the steering arms 36 of front wheels 38 are connected by links 40 to an interconnecting tie rod 42, which is slidable in a housing sleeve 44. The central portion of tie rod 42 has a toothed rack 46 which is engaged by a pinion 48 on the steering column 50, the pinion being journalled in a casing 52 integral with housing sleeve 44. As the steering column 50 is turned the tie rod 42 is moved laterally to provide the appropriate steering action of the wheels. Housing sleeve 44 itself is axially slidable in supports 54 fixed on a frame cross member 56, or other convenient structure. Sensing rod 34 is attached to a lug 58 fixed on the housing sleeve 44, so that motion of the housing sleeve relative to the vehicle frame causes axial motion of the sensing rod within valve 30. Any suitable shock absorbing or resilient wheel suspension means may be used, as indicated at 59, which shows a typical arrangement.

The sensing valve 30 has a pair of inlets 60 and 62 coupled to the pressure side of a pump 64, which is supplied with fluid from a reservoir 66, the valve having a pair of outlets 68 and 69 from which fluid is returned to the reservoir. Valve 30 a pair of outlets 70 and 72 inwardly offset from inlets 60 and 62. Sensing rod 34 carries three valve elements 74, 76 and 78 which control the relative inlet and outlet areas.

In the neutral position, when lug 58 is not applying any force to sensing rod 34, the valve elements 74, 76, and 78 will adjust the areas of inlets 60 and 62 and outlets 68 and 69 so as to arrive at zero net force on sensing rod 34. Outlets 70 and 72 are connected respectively to inlets 80 and 82 at opposite ends of actuating cylinder 22 so that, when the net force on sensing rod 34 is zero the net force on piston rod 20 is also zero and no force is applied to the valve.

If a lateral force exists between the wheels and the ground, resulting from making a turn, moving along a surface which slopes to one side, or encountering a cross wind, the castering action of the wheels will cause a force to be applied by steering arms 36 to the assembly comprising members 40, 42, 44, 46, 48, 52 and 58. Lug 58 will apply the force to sensing rod 34, which will displace valve elements 74, 76 and 78. In FIGURE 4 the displaced position of the elements indicated by broken lines, resulting from the existence of a force to the right acting on the wheels through their contact with the ground, as in the case of a right turn.

As shown, the application of a force to the right on the wheels will displace the valve elements to the left, relative to the valve body 30 which is fixed to the frame. This will open inlet 60 and outlet 69, while simultaneously closing inlet 62 and outlet 68. Thus the increased pressure at outlet 70 and the decreased pressure at outlet 72 will cause fluid to flow into cylinder 22 through inlet 80 and out of cylinder 22 through inlet 82. This will drive piston rod 20 rearward and swing vane 14 to the left, reating an aerodynamic force to the right. This aerodynamic force acts in the same direction as the side force applied to the wheels by the ground and serves both to make attainable a greater side force than the wheels alone can generate and to overcome the rolling, or overturning, moment produced by the side force on the wheels. As the force diminishes the sensing valve will return the vane to neutral. This type of valve and its operation are well known and conventional valve units may be adapted for the system.

It should be noted that the motion of housing sleeve 14 relative to the frame is entirely independent of the wheel steering angle, since the force is transferred by the tie rod 42 to the housing sleeve through pinion 48, regardless of the position of the tie rod relative to the housing sleeve. The vane is not operated in conjunction with the steering, but merely uses an adaptation of the steering assembly as a convenient means for coupling a sensing element between frame and wheels.

While the sensing element is illustrated as connected between the vehicle frame and a specially adapted portion of the coupling between the front wheels, it will be evident that the force of interest can be measured at other locations. The sensing element could be coupled between the frame and the suspension of any wheel, where a relative motion would occur corresponding to the offset load. Also, the sensing and vane operation could be electrical, mechanical, or fluid means, or combinations of these.

It is understood that minor variation from the form of the invention disclosed herein may be made without departure from the spirit and scope of the invention, and that the specification and drawings are to be considered as merely illustrative rather than limiting.

I claim:
1. In combination with a high speed vehicle having a frame structure and wheels mounted thereon, an antiskid means comprising:
   a vane mounted upon the vehicle and being pivotal about a substantially vertical axis;
   sensing means mounted on the vehicle to sense generally a side force between the wheels and the ground;
   and actuating means connected to said vane and controlled by said sensing means to swing the vane, generating an aerodynamic side force on the vane in the same direction as the side force applied to the wheels by the ground.
2. The combination according to claim 1, wherein the areodynamic side force is generally proportional to the side force applied to the wheels by the ground.
3. The combination according to claim 1, wherein said sensing means is connected between said frame structure and at least one of said wheels.
4. The combination according to claim 1 and including a fixed fin on said vehicle, supporting said vane.
5. The combination according to claim 1, wherein said actuating means is fluid operated;
   said sensing means having a valve therein directly operated by relative motion resulting from the side force between the wheels and the ground;
   and a source of pressurized fluid connected through said valve to said actuating means.
6. The combination according to claim 1, and including a tie bar interconnecting the front wheels of the vehicle;
   one portion of said sensing means being secured to said frame structure;
   and coupling means connecting another portion, to said tie rod.
7. The combination according to claim 6, wherein said coupling means includes a housing mounted for substantially lateral sliding motion in said frame, said sensing means being attached to said housing;
   said tie rod being slidable in said housing;
   and steering means mounted on said housing and coupled to said tie rod.

References Cited

UNITED STATES PATENTS 2,046,042    6/1936    Turner.
2,665,137    1/1954    Kamm.
2,976,077    3/1961    Totton.

BENJAMIN HERSH, *Primary Examiner.*

J. H. BRANNEN, *Assistant Examiner.*